US009626937B2

(12) United States Patent
Liu et al.

(10) Patent No.: US 9,626,937 B2
(45) Date of Patent: Apr. 18, 2017

(54) DRIVING METHOD AND DRIVING SYSTEM FOR DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Lei Liu, Beijing (CN); Daekeun Yoon, Beijing (CN); Weihao Hu, Beijing (CN); Luqiang Guo, Beijing (CN); Rui Guo, Bejing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/446,667

(22) Filed: Jul. 30, 2014

(65) Prior Publication Data
US 2015/0255041 A1  Sep. 10, 2015

(30) Foreign Application Priority Data
Mar. 7, 2014 (CN) .......................... 2014 1 0084119

(51) Int. Cl.
G09G 5/18 (2006.01)
G06F 3/14 (2006.01)
G09G 3/34 (2006.01)

(52) U.S. Cl.
CPC ............. *G09G 5/18* (2013.01); *G06F 3/1438* (2013.01); *G06F 3/1446* (2013.01); *G09G 3/34* (2013.01); *G09G 2310/0232* (2013.01); *G09G 2310/08* (2013.01); *G09G 2370/08* (2013.01)

(58) Field of Classification Search
CPC .... G09G 5/10; G09G 5/18; G09G 2310/0232; G09G 2310/08; G09G 2370/08; G09G 3/34; G06F 3/1438; G06F 3/1446
USPC ................. 345/1.3, 204, 691, 1.1, 102, 144; 349/144
See application file for complete search history.

(56) References Cited

U.S. PATENT DOCUMENTS 5,655,940 A * 8/1997 Hodson .................... G09G 3/22
   313/495
6,501,441 B1 * 12/2002 Ludtke .................. G06F 3/1446
   345/1.1
7,456,836 B2 * 11/2008 Mamiya ................ G06F 3/1446
   345/1.1

(Continued)

*Primary Examiner* — Tony Davis
(74) *Attorney, Agent, or Firm* — Nath, Goldberg & Meyer; Joshua B. Goldberg; Christopher Thomas

(57) ABSTRACT

The invention provides a driving method and a driving system for a display panel. The driving method comprises: partitioning the display panel into N display sub-areas, each of which is used for displaying the 1/N sub-picture of the whole frame of picture to be displayed and correspondingly controlled by one timing controller, wherein N≥2 and N is an integer, and the data signal of the whole frame of picture to be displayed is allocated to each of the timing controllers. According to the driving method and the driving system, by allocating the data signal of the whole frame of picture to be displayed to each of timing controllers, the backlight brightness provided by the different backlight sub-areas is the same, and then a joint or boundary phenomenon occurring among the different backlight sub-areas is avoided.

6 Claims, 2 Drawing Sheets

(56) References Cited

U.S. PATENT DOCUMENTS

| | | | | |
|---|---|---|---|---|
| 7,728,788 B1* | 6/2010 | Echols | ................ | G09G 3/2092 345/1.3 |
| 7,907,142 B2* | 3/2011 | Racicot | ............. | H04N 5/44591 345/502 |
| 8,184,114 B2* | 5/2012 | Oh | ....................... | G06F 3/1446 345/1.1 |
| 8,248,425 B2* | 8/2012 | Ghosh | .................. | G06F 3/1423 345/1.1 |
| 9,179,111 B2* | 11/2015 | Collier | .................... | H04N 9/12 |
| 2004/0061661 A1* | 4/2004 | Kishita | ................ | G06F 3/1446 345/1.1 |
| 2008/0074382 A1* | 3/2008 | Lee | ..................... | G09G 3/3413 345/102 |
| 2008/0150853 A1* | 6/2008 | Peng | ................... | G09G 3/3426 345/87 |
| 2008/0150880 A1* | 6/2008 | Inuzuka | ............... | G09G 3/3413 345/102 |
| 2010/0165013 A1* | 7/2010 | Yamamoto | ........... | G09G 3/3413 345/692 |
| 2010/0302214 A1* | 12/2010 | Kim | ........................ | G09G 3/20 345/204 |
| 2011/0063315 A1* | 3/2011 | Ghosh | .................. | G06F 3/1423 345/536 |
| 2011/0157257 A1* | 6/2011 | Bennett | ..................... | G06F 3/14 345/690 |
| 2012/0113159 A1* | 5/2012 | Chiba | ................ | G02B 27/2214 345/690 |
| 2012/0140160 A1* | 6/2012 | Han | ................... | G02F 1/13336 349/144 |
| 2014/0307011 A1* | 10/2014 | Ninan | .................... | G09G 3/342 345/691 |

* cited by examiner

DRIVING METHOD AND DRIVING SYSTEM FOR DISPLAY PANEL

FIELD OF THE INVENTION

The present invention relates to the field of display technologies, and particularly relates to a driving method and a driving system for a display panel.

BACKGROUND OF THE INVENTION

With the rapid development of display technologies, large-size display products increasingly become a popular target for people because of the capability of bringing more abundant visual enjoyment for people.

Large-size display panels are generally high in resolution, that is, the quantity of pixels arranged in each row and each column, on each display panel is correspondingly increased, and during display, if only one timing controller is used for driving, the display speed will be well reduced; and charge time for each pixel is correspondingly shortened, which easily causes the display abnormality of the display panel. Therefore, each large-size display panel is usually driven by two or more timing controllers.

Driving by using two or more timing controllers is mainly realized by partitioning a display picture, that is, partitioning the whole frame of a picture, the picture signals of corresponding different partitioned areas are received by each of the timing controllers respectively, thus controlling the display panel to carry out partitioning display on the display picture.

While receiving a corresponding partitioned picture signal, each of the timing controllers calculates an average brightness and the maximum brightness of the corresponding partitioned picture, and provides respective needed backlight brightness and picture compensation values for the corresponding partitioned picture. Because the picture contents of the partitioned pictures are different, the respective needed backlight brightness and picture compensation values which are finally calculated are different. Therefore, the backlight brightness of the whole display panel while displaying the whole frame of picture is non-uniform, thus the picture compensation for the whole frame of picture is non-uniform, that is, the brightness of the partitioned pictures is different from each other, and then an obvious joint or boundary phenomenon occurs among the plurality of partitioned pictures of the whole frame of picture, and the display effect is influenced.

In addition, in the case of the partitioning display above, the plurality of partitioned picture signals cannot synchronously arrive at the respective corresponding display areas on the display panel under the control of the respective corresponding timing controllers, thus the plurality of partitioned pictures of the whole frame of picture cannot be well continued during display, and then the obvious joint or boundary phenomenon occurs among the plurality of partitioned pictures of the whole frame of picture.

SUMMARY OF THE INVENTION

The present invention provides a driving method and a driving system for a display panel, aiming at the technical problems above existing in the prior art. According to the driving method, by allocating the data signal of a whole frame of picture to be displayed to each of timing controllers, and synchronously allocating the data signal of the whole frame of picture to be displayed to each of the timing controllers, the brightness of the backlights provided by all backlight sub-areas of the display panel is the same, and all 1/N sub-pictures can be well continued while being displayed in the corresponding display sub-areas, and then a joint or boundary phenomenon occurring among the backlight sub-areas and among the 1/N sub-pictures is avoided.

The present invention provides a driving method for a display panel, comprising: partitioning the display panel into N display sub-areas, each of which is used for displaying the 1/N sub-picture of the whole frame of picture to be displayed and correspondingly controlled by one timing controller, wherein N≥2 and N is an integer; and allocating the data signal of the whole frame of picture to be displayed to each of the timing controllers.

Preferably, before allocating the data signal of the whole frame of picture to be displayed to each of the timing controllers, the driving method further comprises: calculating the delay time of each of the timing controllers while receiving the data signal of the whole frame of picture to be displayed, and compensating for the delay time, so that the data signal of the whole frame of picture to be displayed can be synchronously input to each of the timing controllers.

Preferably, a DE signal exists in the data signal of the whole frame of picture to be displayed, and the delay time of each of the timing controllers while receiving the data signal of the whole frame of picture to be displayed is calculated by calculating the difference between the timings when the timing controllers receive the DE signaltime difference of each of the timing controllers while receiving the DE signal.

Preferably, a feedback signal is automatically transmitted by each of the timing controllers while receiving the data signal of the whole frame of picture to be displayed, and the delay time of each of the timing controllers while receiving the data signal of the whole frame of picture to be displayed is calculated according to the feedback signal.

Preferably, when the data signal of the whole frame of picture to be displayed is allocated to each of the timing controllers, the delay time of allocating the data signal of the whole frame of picture to be displayed by an allocating terminal is calculated and compensated, so that the data signal of the whole frame of picture to be displayed can be synchronously input to each of the timing controllers.

Preferably, the data signal of the whole frame of picture to be displayed is input to all of the timing controllers through lines with the same length.

Preferably, the driving method for the display panel further comprises partitioning the backlight source of the display panel into N backlight sub-areas, which are correspondingly provided with backlight source by the N backlight sub-areas respectively;

controlling, by each of the timing controllers, display for the 1/N sub-pictures of the whole frame of picture to be displayed, and inputting, by the timing controllers, the data signal of each of the 1/N sub-pictures to the corresponding display sub-areas through lines with the same length;

calculating, by each of the timing controllers, according to the data signal of the whole frame of picture to be displayed to obtain the brightness parameters of the whole frame of picture to be displayed, and providing, by the timing controllers, the brightness parameters of the whole frame of picture to be displayed for the corresponding backlight sub-areas respectively.

The present invention further provides a driving system for a display panel, comprising a signal source module and N timing controllers; the display panel comprises N display sub-areas, the signal source module is used for providing the data signal of the whole frame of picture to be displayed;

each of the timing controllers is used for controlling one of the display sub-areas to display the 1/N sub-pictures of a whole frame of picture to be displayed, wherein N≥2 and N is an integer; and wherein the driving system further comprises an allocator used for receiving the data signal of the whole frame of picture to be displayed, which is provided by the signal source module, and allocating the data signal of the whole frame of picture to be displayed to each of the timing controllers.

Preferably, the allocator comprises an input terminal and N output terminals;

the input terminal is connected with the signal source module, and used for receiving the data signal of the whole frame of picture to be displayed, which is provided by the signal source module; and the N output terminals are correspondingly connected with the N timing controllers one to one, and used for transmitting the data signal of the whole frame of picture to be displayed to the N timing controllers respectively.

Preferably, the allocator further comprises a calculation module and a compensation module;

the calculation module is used for calculating the delay time of each of the timing controllers while receiving the data signal of the whole frame of picture to be displayed, and feeding the delay time back to the compensation module; and the compensation module is used for receiving the delay time, compensating for the delay time, and transmitting the data signal of the whole frame of picture to be displayed, subjected to compensation for the delay time, to the corresponding output terminals.

Preferably, a DE signal exists in the transmitted data signal of the whole frame of picture to be displayed, and the delay time of each of the timing controllers while receiving the data signal of the whole frame of picture to be displayed is calculated by the calculation module through calculating the time difference between the timings when the timing controllers receive the DE signal by the calculation module.

Preferably, a feedback signal is automatically transmitted by each of the timing controllers while receiving the data signal of the whole frame of picture to be displayed, and the delay time of each of the timing controllers while receiving the data signal of the whole frame of picture to be displayed is calculated by the calculation module according to the feedback signal.

Preferably, when the data signal of the whole frame of picture to be displayed is allocated to each of the timing controllers, the delay time of allocating the signal by each of the output terminals of the allocator is calculated and compensated, thus the data signal of the whole frame of picture to be displayed can be synchronously input to each of the timing controllers.

Preferably, the lines between the input terminal and the output terminals are the same in length.

Preferably, the backlight source of the display panel comprises N backlight sub-areas, and the N backlight sub-areas are used for correspondingly providing a backlight source for the N display sub-areas respectively;

each of the timing controllers is used for controlling display for the 1/N sub-pictures of the whole frame of picture to be displayed, and inputting the data signal of each of the 1/N sub-pictures to the corresponding display sub-areas through lines with the same length; and each of the timing controllers is used for calculating according to the data signal of the whole frame of picture to be displayed to obtain brightness parameters of the whole frame of picture to be displayed, and providing the brightness parameters of the whole frame of picture to be displayed for each of the backlight sub-areas.

The present invention has the following beneficial effects: according to the driving method for the display panel, which is provided by the present invention, the data signal of the whole frame of picture to be displayed is allocated to each of timing controllers; whereas according to the driving system for the display panel, which is provided by the present invention, the allocator is provided and used for allocating the data signal of the whole frame of picture to be displayed to each of the timing controllers, and each of the timing controllers is used for calculating to obtain the same backlight brightness parameters of the whole frame of picture to be displayed, thus the backlight brightness parameters received by different backlight sub-areas are the same, and the brightness of the backlights provided by the different backlight sub-areas is the same, and then a joint or boundary phenomenon occurring among the different backlight sub-areas and among the different sub-pictures is avoided. Further, according to the driving method, a delay time of each of the timing controllers while receiving the data signal of the whole frame of picture to be displayed is calculated and compensated; or the data signal of the whole frame of picture to be displayed is input to all of the timing controllers through lines with the same length; whereas according to the driving system, the calculation module and the compensation module are arranged and used for calculating the delay time of each of the timing controllers while receiving the data signal of the whole frame of picture to be displayed, and compensating for the delay time or the lengths of the lines between the input terminal and the output terminals of the allocator are set to be equal, thus the data signal of the whole frame of picture to be displayed is input to all of the timing controllers through the lines with the same length, and then the data signal of the whole frame of picture to be displayed can be synchronously input to each of the timing controllers. And then a joint or boundary phenomenon occurring among the different backlight sub-areas and among the different 1/N sub-pictures is avoided, and the partitioning display effect of the display panel is guaranteed.

DETAILED DESCRIPTION OF THE EMBODIMENTS

Figure 1:
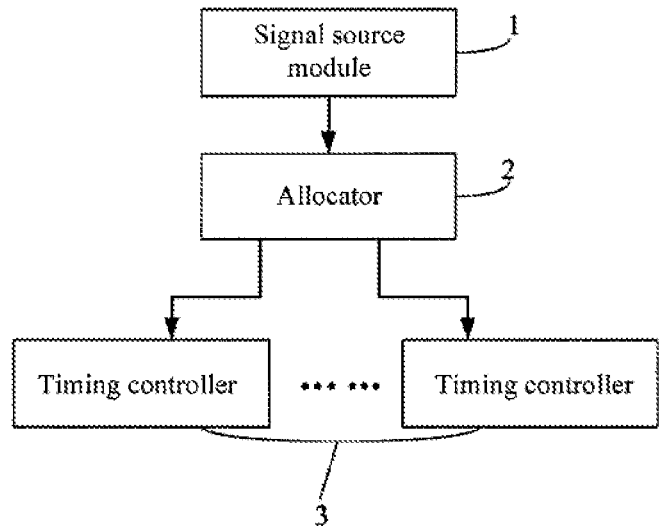
FIG. 1 is a functional block diagram of a driving system for a display panel in embodiment 3 of the present invention.

In order to enable a person skilled in the art to understand the technical solution of the present invention better, a driving method and a driving system for a display panel, which are provided by the present invention are further described in detail below in combination with the accompanying drawings and specific implementations.

Embodiment 1

The embodiment of the present invention provides a driving method for a display panel, comprising: partitioning the display panel into N display sub-areas, each of which is used for displaying a 1/N sub-picture of the whole frame of a picture to be displayed and correspondingly controlled by one timing controller, wherein N≥2 and N is an integer, and the data signal of the whole frame of picture to be displayed is allocated to each of the timing controllers.

In the embodiment, N is set to 2, that is, the display panel is divided into two display sub-areas, correspondingly, two timing controllers are provided, and each of the display sub-areas is used for displaying a ½ sub-picture of the whole frame of picture to be displayed. The two ½ sub-pictures are correspondingly controlled by the two timing controllers respectively, and correspondingly displayed by the two display sub-areas of the display panel respectively. It should be noted that, before controlling the two display sub-areas of the display panel to display, what is received by the two timing controllers from a signal source terminal is the same data signal of the whole frame of picture to be displayed.

In the embodiment, when the backlight brightness of the backlight source of the display panel is calculated, the backlight source is theoretically divided into two backlight sub-areas, and the two display sub-areas are correspondingly provided with backlight by the two backlight sub-areas respectively. The two timing controllers calculate brightness parameters of the whole frame of picture to be displayed while receiving the same data signal of the whole frame of picture to be displayed, and providing the brightness parameters for the control circuit for each of the backlight sub-areas through the lines with the same length respectively. As the brightness parameters received by the control circuit for each of the backlight sub-areas are the same, therefore, when the respective ½ sub-pictures are displayed by the two display sub-areas of the display panel, the brightness provided by the respective backlight sub-areas is the same, thus a joint or boundary phenomenon occurring between the two backlight sub-areas is avoided.

In the embodiment, before allocating the data signal of the whole frame of picture to be displayed to each of the timing controllers, the driving method further comprises: calculating the delay time for each of the timing controllers while receiving the data signal of the whole frame of picture to be displayed, and compensating for the delay time, and the specific compensation step is that, for example, if a delay time t of the time when the first timing controller receives the data signal of the whole frame of picture to be displayed relative to the time when the second timing controller receives the data signal of the whole frame of picture to be displayed is calculated, then the output time of allocating the data signal of the whole frame of picture to be displayed to the second timing controller is delayed by the time t, thus the data signal of the whole frame of picture to be displayed can be synchronously input to each of the timing controllers. That is, all the timing controllers are capable of receiving the data signal of the whole frame of picture to be displayed simultaneously. Therefore, during the process of inputting the data signal of the whole frame of picture to be displayed to each of the timing controllers, desynchrony between the signal transmissions is avoided, and then energy consumption during the signal transmission process is greatly reduced.

In addition, in the embodiment, each of the timing controllers is used for controlling display for the ½ sub-pictures of the whole frame of picture to be displayed, and inputting the data, signal of each of the ½ sub-pictures to the corresponding display sub-areas through lines with the same length, that is, the display sub-areas may receive the data signal of the corresponding ½ sub-picture simultaneously. Therefore, during the process of inputting the data signal of each of the ½ sub-pictures to the corresponding display sub-area, a phenomenon of different signal noises due to the desynchrony between the signal transmissions is avoided, thus energy consumption during the signal transmission process is greatly reduced; and moreover, the data signals of the two ½ sub-pictures can be synchronously input to the corresponding display sub-areas, thus the two ½ sub-pictures of the whole frame of picture to be displayed can be well continued while being displayed in the two corresponding display sub-areas, and then a joint or boundary phenomenon occurring between the two ½ sub-pictures is avoided.

In this case, the delay time for each of the timing controllers while receiving the data signal of the whole frame of picture to be displayed can be calculated, and the different timing controllers are compensated according to the calculated according delay times (the delay time of each of the timing controllers is different), thus guaranteeing that the data signal of the whole frame of picture to be displayed can be synchronously input to each of the timing controllers. The calculation method for the delay time is that, for example, as a DE signal exists in each frame of the transmitted signal, the DE signal can be decoded by a specific IC (integrated circuit), and the delay time for each of the timing controllers is calculated by measuring the time difference between timings when the timing controllers receive the DE signal.

As a choice, the delay time of each of the timing controllers may also be determined by automatically calculation, for example, a feedback signal is automatically transmitted by each of the timing controllers while receiving the data signal of the whole frame of picture to be displayed, and the delay time of each of the timing controllers while receiving the data signal of the whole frame of picture to be displayed is automatically calculated by a calculation module according to the transmission time of the feedback signals, and the delay time is compensated for in real time. The specific compensation step is that, for example, if a delay time t of the first timing controller while receiving the data signal of the whole frame of picture to be displayed relative to the second timing controller while receiving the data signal of the whole frame of picture to be displayed is calculated, then the time of outputting the data signal of the whole frame of picture to be displayed to the second timing controller is delayed by the time t. Or, when the data signal of the whole frame of picture to be displayed is allocated to each of the timing controllers, the delay time for allocating the signal by each of the output terminals of the allocator is automatically calculated, and the delay time is compensated in real time, thus guaranteeing that the data signal of the whole frame of picture to be displayed can be synchronously input to each of the timing controllers.

Embodiment 2

The embodiment provides a driving method for a display panel. It is different from embodiment 1 that, in the embodiment, the data signal of the whole frame of picture to be displayed can be synchronously input to each of the timing controllers in another manner instead of calculating the delay time for each of the timing controllers while receiving the data signal of the whole frame of picture to be displayed, and compensating for the delay time. Specifically, in the embodiment, the data signal of the whole frame of picture to be displayed is synchronously input to each of the timing controllers by inputting the data signal of the whole frame of picture to be displayed to all of the timing controllers through the lines with the same length.

Therefore, during the process of inputting the data signal of the whole frame of picture to be displayed to each of the timing controllers, the desynchrony (such as different lengths of transmission lines) between the signal transmissions is avoided, and then energy consumption during the signal transmission process is greatly reduced.

The other parts of the driving method for the display panel in the embodiment are the same as those of embodiment 1, and are not described redundantly herein.

Due to the arrangement of the lines with the same length, the data signal of the whole frame of picture to be displayed can be synchronously input to each of the timing controllers, and the data signals of the ½ sub-pictures can be synchronously input to the corresponding display sub-areas, thus the two ½ sub-pictures of the whole frame of picture to be displayed can be well continued while being displayed in the two corresponding display sub-areas, and then a joint or boundary phenomenon occurring between the two backlight sub-areas and between the two ½ sub-pictures, caused by time delay of signal transmission, is avoided.

It should be noted that, N may be any integer greater than 2, that is, the display panel may be divided into any number of display sub-areas, correspondingly, any number of timing controllers may also be provided, and a joint or boundary phenomenon occurring among the backlight sub-areas and among the 1/N sub-pictures can be avoided so long as by guaranteeing that the data signal of the whole frame of picture to be displayed can be synchronously input to each of the timing controllers during the partitioning area process of displaying the whole frame of picture in partitioning areas for the whole frame of picture to be displayed.

The embodiments 1-2 have the following beneficial effects: according to the driving method for the display panel, which is provided by the embodiments 1-2, by allocating the data signal of the whole frame of picture to be displayed to each of timing controllers, the backlight parameters of the whole frame of picture to be displayed, which are obtained by the different timing controllers by calculating are the same, and then the backlight parameters received by different backlight sub-areas are the same, and the brightness of backlights provided by the different backlight sub-areas is the same, and then a joint or boundary phenomenon occurring among the different backlight sub-areas is avoided. Further, according to the driving method, the delay time of each of the timing controllers while receiving the data signal of the whole frame of picture to be displayed is calculated and compensated; or the data signal of the whole frame of picture to be displayed is input to all the timing controllers through the lines with the same length, thus the data signal of the whole frame of picture to be displayed can be synchronously input to each of the timing controllers. And then a joint or boundary phenomenon occurring among the different backlight sub-areas and among the different 1/N sub-pictures is avoided, and the partitioning display effect of the display panel is guaranteed.

Embodiment 3

The embodiment provides a driving system for a display panel, as shown in FIG. 1, comprising a signal source module 1 and N timing controllers 3; the display panel comprises N display sub-areas; the signal source module 1 is used for providing the data signal of the whole frame of a picture to be displayed; each of the timing controllers 3 is used for controlling one of the display sub-areas to display a 1/N sub-picture of a whole frame of picture to be displayed, wherein N≥2 and N is an integer, the driving system further comprises an allocator 2 used for receiving the data signal of the whole frame of picture to be displayed, which is provided by the signal source module 1, and allocating the data signal of the whole frame of picture to be displayed to each of the timing controllers 3.

In this case, the backlight source of the display panel comprises N backlight sub-areas, and the N backlight sub-areas are used for correspondingly providing a backlight for the N display sub-areas respectively. The timing controllers 3 are used for calculating brightness parameters of the whole frame of picture to be displayed according to the data signal of the whole frame of the same picture to be displayed, and providing the brightness parameters for the whole frame of the same picture to be displayed for the control circuit for each of the backlight sub-areas through the lines with the same length respectively. As the brightness parameters received by the control circuit for each of the backlight sub-areas are the same, therefore, when the respective 1/N sub-pictures are displayed by the N display sub-areas of the display panel, the brightness of the backlights provided by the respective backlight sub-areas is the same, thus a joint or boundary phenomenon occurring between the N backlight sub-areas is avoided.

Figure 2:
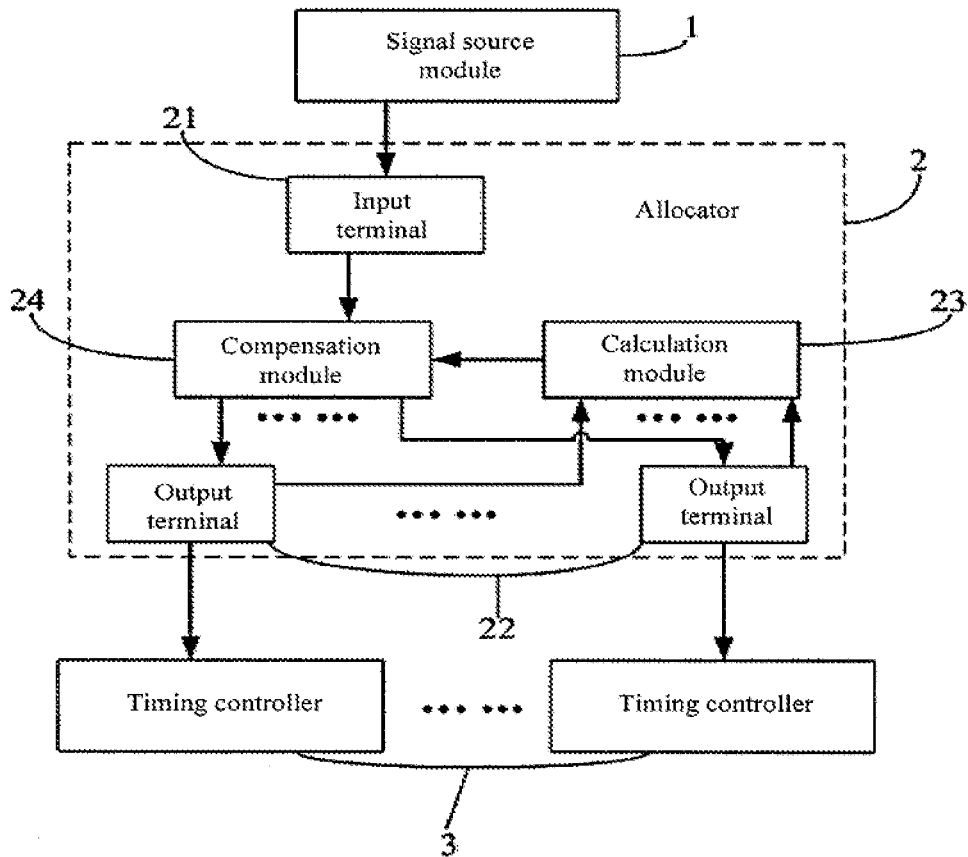
FIG. 2 is a functional block diagram of an allocator for realizing synchronous allocation in FIG. 1.

In the embodiment, as shown in FIG. 2, the allocator 2 comprises an input terminal 21 and N output terminals 22; the input terminal 21 is connected with the signal source module 1, and used for receiving the data signal of the whole frame of picture to be displayed, which is provided by the signal source module 1; the output terminals 22 are correspondingly connected with the timing controllers 3 one to one, and used for transmitting the data signal of the whole frame of picture to be displayed to the N timing controllers 3 respectively.

In the embodiment, the allocator 2 further comprises a calculation module 23 and a compensation module 24. The calculation module 23 is used for calculating the delay time of each of the timing controllers 3 while receiving the data signal of the whole frame of picture to be displayed, and feeding the delay time back to the compensation module 24.

The compensation module 24 is used for receiving the delay time, compensating for the delay time, and transmitting the data, signal of the whole frame of picture to be displayed, subjected to compensation for the delay time, to the corresponding output terminals 22. That is, the data signal of the whole frame of picture to be displayed, subjected to compensation for the delay time, can be transmitted to the output terminals 22 simultaneously, that is, the data signals can be transmitted to each of the timing controllers 3 simultaneously. Therefore, during the process of inputting the data signal of the whole frame of picture to be displayed to each of the timing controllers, the desynchrony between the signal transmissions is avoided, and then energy consumption during the signal transmission process is greatly reduced.

In addition, in the embodiment, each of the timing controllers 3 is used for controlling display for the 1/N sub-pictures of the whole frame of picture to be displayed, and inputting the data signal of each of the 1/N sub-pictures to the corresponding display sub-areas through lines with the same length. That is, each of the display sub-areas may receive the data signals of the corresponding 1/N sub-pictures simultaneously. Therefore, during the process of inputting the data signal of each of the 1/N sub-pictures to the corresponding display sub-area, a phenomenon of different signal noises due to the desynchrony between the signal transmissions is avoided, thus energy consumption during the signal transmission process is greatly reduced; and moreover, the data signals of the N 1/N sub-pictures can be synchronously input to the corresponding display sub-areas, thus the N 1/N sub-pictures of the whole frame of picture to be displayed can be well continued while being displayed in the N corresponding display sub-areas, and then a joint or boundary phenomenon occurring between the N 1/N sub-pictures due to the delay in transmission is avoided.

Figure 3:
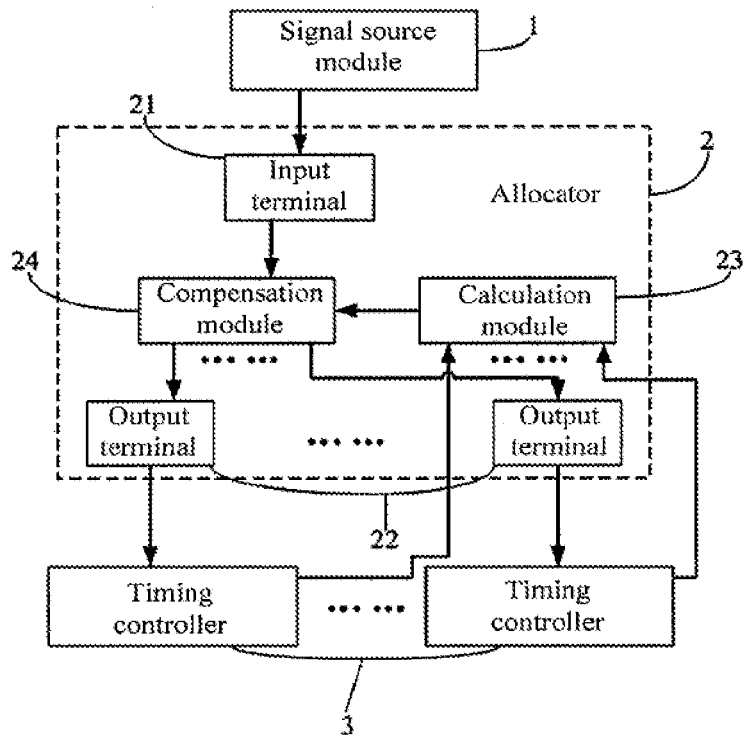
FIG. 3 is a functional block diagram of another allocator for realizing synchronous allocation in FIG. 1.

It should be noted that, in the embodiment, the delay time of each of the timing controllers may be automatically calculated. As shown in FIG. 2, a feedback signal is transmitted to the calculation module 23 by each of the output terminals 22 of the allocator 2 while transmitting the data signal of the whole frame of picture to be displayed to the corresponding timing controller 3; the delay time for the different timing controllers 3 while receiving the data signal of the whole frame of picture to be displayed is automatically calculated by the calculation module 23 according to the transmitting time of the feedback signal, and the delay time is fed back to the compensation module 24; and the delay time is compensated by the compensation module 24 in real time. Or, as shown in FIG. 3, a feedback signal is automatically transmitted to the calculation module 23 by each of the timing controllers 3 while receiving the data signal of the whole frame of picture to be displayed; the delay time for the different timing controllers 3 while receiving the data signal of the whole frame of picture to be displayed is automatically calculated by the calculation module 23 according to the transmitting time of the feedback signal, and the delay time is fed back to the compensation module 24; and the delay time is compensated by the compensation module 24 in real time, thus guaranteeing that the data signal of the whole frame of picture to be displayed can be synchronously input to each of the timing controllers 3.

Embodiment 4

Figure 4:
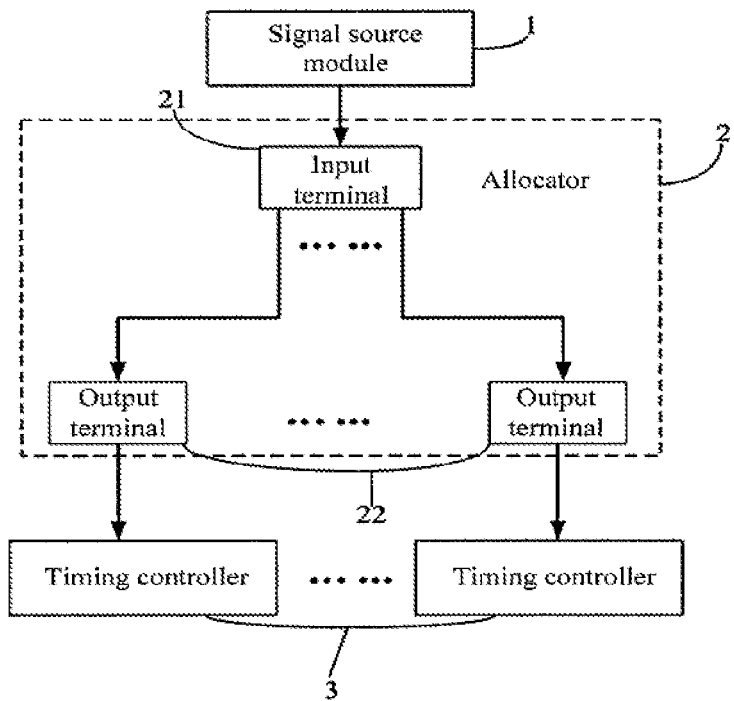
FIG. 4 is a functional block diagram of an allocator for realizing synchronous allocation in embodiment 4 of the present invention.

The embodiment provides a driving system for a display panel. It is different from embodiment 3 that, as shown in FIG. 4, in the embodiment, no calculation module and compensation module are provided. In the embodiment, the data signal of the whole frame of picture to be displayed is synchronously input to each of the timing controllers 3 by enabling the lengths of the lines between an input terminal 21 and output terminals 22 to be equal.

Therefore, during the process of inputting the data signal of the whole frame of picture to be displayed to each of the timing controllers 3, the desynchrony (such as different lengths of transmission lines) between the signal transmissions is avoided, and then energy consumption during the signal transmission process is greatly reduced.

The other structures of the driving system for the display panel in the embodiment are the same as those of embodiment 3, and are not described redundantly herein.

By setting the lengths of the lines between an input terminal 21 of an allocator 2 and output terminals 22 to be equal, the data signal of the whole frame of picture to be displayed can be synchronously input to each of the timing controllers 3; in addition, the data signals of N 1/N sub-pictures can also be synchronously input to the corresponding display sub-areas by the timing controllers 3 through the lines with the same length, thus the N 1/N sub-pictures of the whole frame of picture to be displayed can be well continued while being displayed in the N corresponding display sub-areas, and then a joint or boundary phenomenon occurring due to delay in signal transmission time, among the N backlight sub-areas and among the N 1/N sub-pictures is avoided.

Embodiments 3-4 have the following beneficial effects: according to the driving system for the display panel, which is provided by embodiments 3-4, the allocator is provided and used for allocating the data signal of the whole frame of picture to be displayed, which is provided by the signal source module, to each of timing controllers, the brightness parameters of the whole frame of picture to be displayed, which are obtained by the different timing controllers by calculation are the same, so that the backlight parameters received by different backlight sub-areas are also the same, accordingly the backlight brightness of the backlight provided by the different backlight sub-areas is the same, and then a joint or boundary phenomenon occurring among the different backlight sub-areas is avoided. Further, according to the driving system, the calculation module and the compensation module are provided and used for calculating and compensating for the delay time of each of the timing controllers while receiving the data signal of the whole frame of picture to be displayed; or the lengths of the lines between the output terminals of the allocator and the input terminals of the timing controllers are set to be equal, and the data signal of the whole frame of picture to be displayed is input to all the timing controllers through the lines with the same length, thus the data signal of the whole frame of picture to be displayed can be synchronously input to each of the timing controllers. And then a joint or boundary phenomenon occurring among the different backlight sub-areas and among the different 1/N sub-pictures is avoided, and the partitioning display effect of the display panel is guaranteed.

It may be understood that, the foregoing implementations are merely exemplary implementations adopted for illustrating the principle of the present invention, but the protection scope of the present invention is not limited thereto. Any variations and improvements could be made by a person of ordinary skill in the art without departing from the spirit and essence disclosed in the present invention, but the variations and improvements are still subjected to the protection scope of the present invention.

The invention claimed is:

1. A driving method for a display panel, comprising: partitioning the display panel into N display sub-areas, each of which is configured for displaying a 1/N subpicture of a whole frame of picture to be displayed and correspondingly controlled by one timing controller, wherein N>2 and N is an integer;
wherein a data signal of the whole frame of picture to be displayed is allocated to each of the timing controllers;
wherein before allocating the data signal of the whole frame of picture to be displayed to each of the timing controllers, the driving method further comprises: calculating delay time of each of the timing controllers while receiving the data signal of the whole frame of picture to be displayed, and compensating for the delay time, so that the data signal of the whole frame of picture to be displayed is synchronously input to each of the timing controllers; and
wherein a feedback signal is automatically transmitted by each of the timing controllers while receiving the data signal of the whole frame of picture to be displayed, and the delay time of one of the timing controllers while receiving the data signal of the whole frame of picture to be displayed relative to the other timing controllers while receiving the data signal of the whole frame picture to be displayed is calculated according to the feedback signal.

2. A driving method for a display panel, comprising: partitioning the display panel into N display sub-areas, each of which is configured for displaying a 1/N subpicture of a whole frame of picture to be displayed and correspondingly controlled by one timing controller, wherein N>2 and N is an integer;

wherein a data signal of the whole frame of picture to be displayed is allocated to each of the timing controllers;

wherein when the data signal of the whole frame of picture to be displayed is allocated to each of the timing controllers, a delay time of allocating the data signal of the whole frame of picture to be displayed by one allocating terminal to one timing controller relative to allocating the data signal of the whole frame of picture to be displayed by the other allocating terminal to the other timing controller is calculated and compensated, so that the data signal of the whole frame of picture to be displayed is synchronously input to each of the timing controllers; and wherein before allocating the data signal of the whole frame of picture to be displayed to each of the timing controllers, the driving method further comprises: calculating delay times of each of the timing controllers while receiving the data signal of the whole frame of picture to be displayed, and compensating for the delay times, so that, the data signal of the whole frame of picture to be displayed is synchronously input to each of the timing controllers.

3. A driving method for a display panel, comprising: partitioning the display panel into N display sub-areas, each of which is configured for displaying a 1/N subpicture of a whole frame of picture to be displayed and correspondingly controlled by one timing controller, wherein N>2 and N is an integer;

wherein a data signal of the whole frame of picture to be displayed is allocated to each of the timing controllers;

the driving method for the display panel further comprises partitioning a backlight source of the display panel into N backlight sub-areas, and the N display sub-areas are correspondingly provided with backlight by the N backlight sub-areas;

each of the timing controllers is configured for controlling display for the 1/N sub-picture of the whole frame of picture to be displayed, and the timing controllers input the data signal of the 1/N sub-pictures to the corresponding N display sub-areas through lines with the same length, respectively; and each of the timing controllers is configured for calculating according to the data signal of the whole frame of picture to be displayed to obtain the same brightness parameters of the whole frame of picture to be displayed, and providing the same brightness parameters of the whole frame of picture to be displayed for the corresponding backlight sub-area so that all the N backlight sub-areas have the same brightness parameters.

4. A driving system for a display panel, comprising a signal source module and N timing controllers, wherein the display panel comprises N display sub-areas, the signal source module is configured for providing a data signal of a whole frame of picture to be displayed;

each of the timing controllers is configured for controlling one of the N display sub-areas to display a 1/N sub-picture of the whole frame of a picture to be displayed, wherein N>2 and N is an integer;

wherein the driving system further comprises an allocator configured for receiving the data signal of the whole frame of picture to be displayed, which is provided by the signal source module, and allocating the data signal of the whole frame of picture to be displayed to each of the timing controllers;

wherein the allocator comprises an input terminal and N output terminals, the input terminal is connected with the signal source module, and configured for receiving the data signal of the whole frame of picture to be displayed, which is provided by the signal source module, and the N output terminals are correspondingly connected with the N timing controllers one to one respectively, and configured for transmitting the data signal of the whole frame of picture to be displayed to the N timing controllers respectively;

wherein the allocator further comprises a calculation module and a compensation module, the calculation module is configured for calculating delay time of one of the timing controllers while receiving the data signal of the whole frame of picture to be displayed relative to the other timing controllers while receiving the data signal of the whole frame picture to be displayed, and feeding the delay time back to the compensation module, and the compensation module is configured for receiving the delay time, compensating for the delay time, and transmitting the data signal of the whole frame of picture to be displayed, subjected to compensation for the delay time, to the corresponding N output terminals; and wherein a feedback signal is automatically transmitted by each of the timing controllers while receiving the data signal of the whole frame of picture to be displayed, and the delay time of each of the timing controllers while receiving the data signal of the whole frame of picture to be displayed is calculated by the calculation module according to the feedback signal.

5. A driving system for a display panel, comprising a signal source module and N timing controllers, wherein the display panel comprises N display sub-areas, the signal source module is configured for providing a data signal of a whole frame of picture to be displayed;

each of the timing controllers is configured for controlling one of the N display sub-areas to display a 1/N sub-picture of the whole frame of a picture to be displayed, wherein N>2 and N is an integer;

wherein the driving system further comprising an allocator configured for receiving the data signal of the whole frame of picture to be displayed, which is provided by the signal source module, and allocating the data signal of the whole frame of picture to be displayed to each of the timing controllers;

wherein the allocator comprises an input terminal and N output terminals; the input terminal is connected with the signal source module, and configured for receiving the data signal of the whole frame of picture to be displayed, which is provided by the signal source module, and the N output terminals are correspondingly connected with the N timing controllers one to one respectively, and configured for transmitting the data signal of the whole frame of picture to be displayed to the N timing controllers respectively;

wherein the allocator further comprises a calculation module and a compensation module, the calculation module is configured for calculating delay time of each of the timing controllers while receiving the data signal of the whole frame of picture to be displayed, and feeding the delay time back to the compensation module, and the compensation module is configured for receiving the delay time, compensating for the delay time, and transmitting the data signal of the whole frame of picture to be displayed, subjected to compensation for the delay time, to the corresponding N output terminals; and wherein when the data signal of the whole frame of picture to be displayed is allocated to each of the timing controllers, the delay time of allocating the data signal of the whole frame of picture to be displayed by one of the N output terminals to one timing controller relative to allocating the data signal of the whole frame of picture to be displayed by the other N output terminals to the other timing controller is calculated and compensated, so that the data signal of the whole frame of picture to be displayed is synchronously input to each of the timing controllers.

6. A driving system for a display panel, comprising a signal source module and N timing controllers, wherein the display panel comprises N display sub-areas, the signal source module is configured for providing a data signal of a whole frame of picture to be displayed;

each of the timing controllers is configured for controlling one of the N display sub-areas to display a 1/N sub-picture of the whole frame of a picture to be displayed, wherein N>2 and N is an integer;

wherein the driving system further comprises an allocator configured for receiving the data signal of the whole frame of picture to be displayed, which is provided by the signal source module, and allocating the data signal of the whole frame of picture to be displayed to each of the timing controllers;

wherein a backlight source of the display panel comprises N backlight sub-areas, and the N display sub-areas are correspondingly provided with backlight by the N backlight sub-areas;

each of the timing controllers is configured for controlling display for a 1/N sub-picture of the whole frame of picture to be displayed, and the timing controllers input the data signal of the 1/N sub-pictures to the corresponding display sub-areas through lines with the same length; and each of the timing controllers is configured for calculating according to the data signal of the whole frame of picture to be displayed to obtain the same brightness parameters of the whole frame of picture to be displayed, and providing the same brightness parameters of the whole frame of picture to be displayed for the corresponding backlight sub-areas so that all the N backlight sub-areas have the same brightness parameters.

* * * * *